Jan. 6, 1953    J. H. ALLBRIGHT    2,624,612
SHAFT PULLER
Filed Aug. 19, 1947
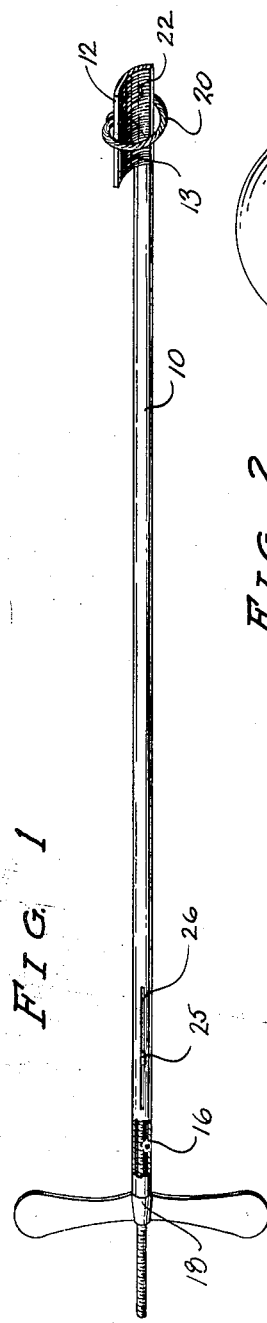
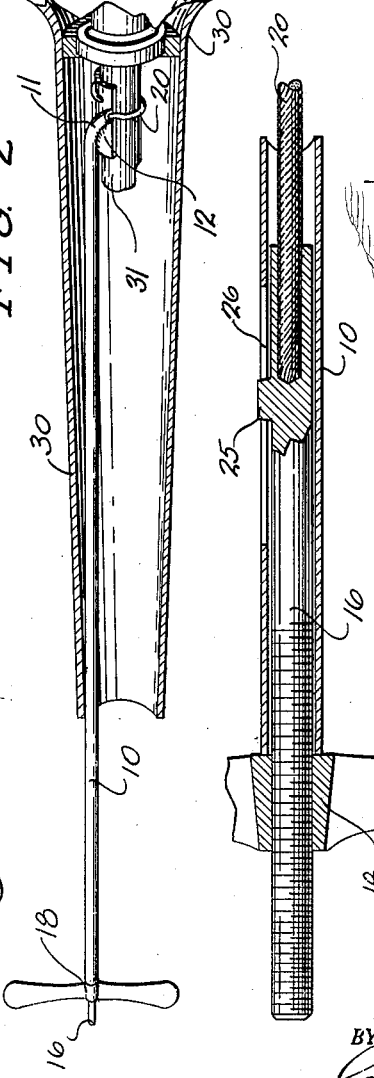
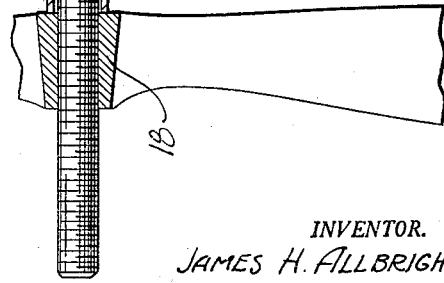
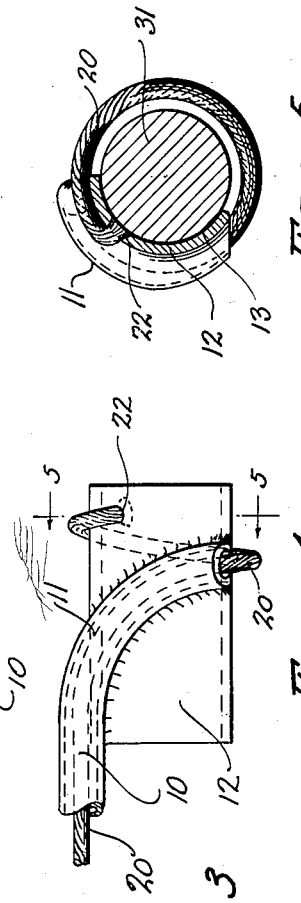
INVENTOR.
JAMES H. ALLBRIGHT
BY
ATTORNEYS Patented Jan. 6, 1953

2,624,612

UNITED STATES PATENT OFFICE 2,624,612

SHAFT PULLER

James H. Allbright, Seattle, Wash.

Application August 19, 1947, Serial No. 769,448

1 Claim. (Cl. 294—103)

This invention relates to devices of that kind generally referred to as "shaft pullers," and which are designed for reaching into tubes, pipes and similar enclosed or restricted areas, for grasping and pulling out objects that cannot be reached or pulled out by use of ordinary tools.

It is the principal object of my invention to provide a device or tool of the above stated character that is especially adapted for the pulling out of portions of broken shafts from the rear axle housings of automobiles, but which may be used in like manner and equally well for various other purposes, and therefore it is not the intent that the use of the tool shall be restricted to any particular application or place of use nor confined to any specific size or proportion of parts.

It is also an object of my invention to provide a shaft puller that is easy to apply and use, that is simple in its design and manner of construction; that is relatively inexpensive to manufacture and which has many different applications and places of use.

Other objects of the invention reside in the details of construction of its parts, in their relationship and mode of use, as will hereinafter be fully described.

In accomplishing the above mentioned and other objects of the invention, I have provided the improved details of construction, the preferred forms of which are illustrated in the accompanying drawings, wherein—

Fig. 1 is a perspective view of a shaft puller embodied by the present invention.

Fig. 2 is a view illustrating the manner of applying the tool within an axle housing for gripping the end portion of a broken shaft for pulling it from the housing.

Fig. 3 is an enlarged, longitudinal section of the outer end portion of the shaft puller tube, showing the cable tightening rod and the application of the wing nut thereto.

Fig. 4 is a view of the back side of the shaft gripping jaw that is fixed to the puller tube, and showing also the manner of extending the looped end of the gripping cable about the inner face of the jaw.

Fig. 5 is a cross section taken on line 5—5 in Fig. 4, showing the mode of application of the puller jaw to a shaft that is to be pulled out and the encirclement of the shaft by the loop end of the clamping cable.

Referring more in detail to the drawings—

The present tool comprises a straight length of pipe or tube 10 open at its outer end and formed at its inner end with a short but gradually formed lateral bend 11, as best shown in Figs. 2 and 4. Welded, or otherwise suitably fixed to the laterally bent portion of the tube, is a gripping jaw 12 comprising a short plate of suitable metal, cylindrically curved and provided across its inside surface with threads, or teeth 13, designed to prevent the plate from slipping on a gripped object. Preferably the jaw 12 would comprise a segment of a short length of internally threaded steel pipe, and it is fixed rigidly and securely to the tube 10 with the axis of curvature of the jaw surface parallel to the tube 10, as has been shown in Fig. 1.

It is shown best in Figs. 1 and 4, that the curved end portion 11 of the tube 10 curves gradually and terminates substantially even with a longitudinal edge of the jaw plate 12; this being for a purpose presently apparent. Contained in the outer end portion of the tube 10 for endwise movement therein, and extended from the tube, is a relatively short rod 16. This rod is threaded substantially throughout its length and mounts a wing nut 18 thereon beyond the outer end of tube 10; the wing nut being adapted to seat against the end of the tube 10 for the cable tightening operation presently described.

At its inner end, the rod 16 has one end of a flexible cable 20 secured therein. Preferably the connection is made by boring a hole in the rod and soldering the cable end in the hole. The cable extends within the tube to its inner end, where it projects from the laterally curved portion 11 beyond the side edge of the jaw 12 and is then extended substantially transversely across the toothed inner face of the jaw and to the back side thereof, where the cable end is secured. Preferably the jaw is formed with a hole, as at 22, designed to receive the end of the cable therein, and securement of the cable is effected by extending the cable end through the hole then spreading the strands of the cable and anchoring them in the hole by babbitting or the like.

The rod 16 has a key or lug 25 on one side that is movable in a longitudinal slot 26 in the tube 10 to keep the rod from turning with the tightening of the nut thereon. The parts are so arranged that by tightening the wing nut on the rod, thus drawing the rod outwardly from the tube, the cable will be drawn taut, thus to draw the looped end portion that extends across the jaw 12 toward the jaw face to coact therewith to grip an object between them.

The application of the device for pulling a broken shaft from an axle housing is typical of the various uses of the tool. This application would be as has been illustrated in Fig. 2, wherein 30 designates an axle housing and 31 designates a portion of shaft to be pulled out. The jaw mounting end of tube 10 is extended into the housing 41 from its open outer end. The cable loop is then expanded by threading the nut 18 outwardly on the rod 16 and then pushing the rod inwardly. After the loop has thus been expanded to sufficient amount, the rod 10 is pushed inwardly so that the jaw portion 12 may be engaged against one side of the broken shaft and the expanded loop portion of the cable will receive the shaft therein as has been shown in Fig. 5. After the loop has been applied about the shaft end, the cable is then tightened by threading the nut 18 inwardly along the rod 16. The nut when so tightened will engage against the outer end of tube 10 and with the increased tightening of the cable, the loop will be drawn tightly about the shaft and cause it to be clamped securely against the toothed face of jaw 12. Through the mediacy of the nut 18, the clamping action may be made exceedingly tight and the jaw held against slippage on the shaft under the pull required for extraction of the shaft.

It is also to be noted that the wing nut 18 has wings of such length that they may be conveniently used as hand holds to aid in pulling the gripped shaft out from the housing.

Devices of this kind may be made in various lengths and of parts of various dimensions to best suit the particular uses to which they are to be applied. Furthermore, the jaws 12 may be secured to the tube 10 in any suitable manner, for example by welding, as shown, or by riveting a separately formed cable guide casting to the back face of the jaw, which casting would correspond to the laterally curved portion 11 of the pipe 10. The pipe 10 could then be made straight and threaded into the casting or otherwise secured thereto.

The main features of the present invention reside in providing an elongated tubular member of a character adapted to be easily extended into restricted places or areas, and which has a jaw at its inner end arranged to engage against one side of an object that is to be extracted from the area and a cable loop extended within the tube and from its inner end as shown for partly encircling the object that is to be extracted and there being means at the outer end of the tube for clamping the object against the jaw with sufficient holding pressure that the extraction may be effected. It is most desirable that the cable shall extend substantially transversely across the jaw as shown and that the cable shall emerge from the end of the tube 10 in such manner that it will not kink when tension is placed on it.

Devices of this character are especially desirable for the extraction of broken shafts from axle housings, for gripping broken pipes or rods that are contained within tubular casings where ordinary grappling tools cannot be applied.

Having thus described my invention, what I claim as new therein, and desire to secure by Letters Patent, is:

A shaft puller comprising an elongated, puller tube of relatively small diameter, open to its full length and formed at its inner end with a short, gradually curved lateral bend, a cylindrically curved jaw plate fixed upon the inner end portion of said tube across the said lateral bend thereof and with one side edge even with the end of the tube; said plate providing a cylindrically curved seat, that faces away from the tube and is parallel thereto, and adapted to receive thereagainst one side of a shaft that is parallel to the puller tube, a cable slidably contained within the tube and having its inner end portion extended from the inner open end of the tube, then transversely across the plate seat and secured at its end to the plate at the under side, thus providing a shaft gripping loop, and means at the outer end of the puller tube attached to the cable for applying tension thereto to tighten the loop against a shaft that may be received against the seat beneath the cable loop.

JAMES H. ALLBRIGHT.

REFERENCES CITED

The following references are of record in the file of this patent:

UNITED STATES PATENTS

| Number | Name | Date |
| --- | --- | --- |
| 20,711 | Hopkins | June 29, 1858 |
| 71,393 | Kuntz | Nov. 26, 1867 |
| 189,962 | Sheldon et al. | Apr. 24, 1877 |
| 526,047 | Newell | Sept. 18, 1894 |
| 1,301,202 | Walker | Apr. 22, 1919 |
| 1,389,011 | Quinn | Aug. 30, 1921 |
| 1,638,918 | Clark | Aug. 16, 1927 |
| 1,821,356 | Newton | Sept. 1, 1931 |
| 1,916,866 | Porter et al. | July 4, 1933 |
| 2,145,359 | Labbe | Jan. 31, 1939 |
| 2,241,207 | Kouba | May 6, 1941 |
| 2,247,642 | Neville | July 1, 1941 |
| 2,345,555 | Dean | Apr. 4, 1944 |